US008145994B2

(12) United States Patent
Cui et al.

(10) Patent No.: US 8,145,994 B2
(45) Date of Patent: Mar. 27, 2012

(54) CATEGORIZING DOCUMENT ELEMENTS BASED ON DISPLAY LAYOUT

(75) Inventors: Hai Cui, Beijing (CN); Chundong Wang, Beijing (CN); Paul Clanton Nelson, Beijing (CN)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 12/345,627

(22) Filed: Dec. 29, 2008

(65) Prior Publication Data

US 2010/0169765 A1 Jul. 1, 2010

(51) Int. Cl.
*G06F 17/00* (2006.01)
(52) U.S. Cl. ........ 715/246; 715/234; 715/205; 715/209; 715/760
(58) Field of Classification Search .................. 715/200, 715/205, 209–210, 234, 238, 243–253, 760, 715/788, 810, 866; 382/173–180; 709/217–219; 707/E17.121
See application file for complete search history.

(56) References Cited

U.S. PATENT DOCUMENTS

| | | | | |
|---|---|---|---|---|
| 5,784,487 A | * | 7/1998 | Cooperman | 382/175 |
| 5,848,184 A | * | 12/1998 | Taylor et al. | 382/173 |
| 6,023,714 A | * | 2/2000 | Hill et al. | 715/235 |
| 7,203,901 B2 | * | 4/2007 | Chen et al. | 715/205 |
| 7,212,309 B1 | * | 5/2007 | Sellers et | 358/1.2 |
| 7,721,197 B2 | * | 5/2010 | Baudisch et al. | 715/238 |
| 7,913,163 B1 | * | 3/2011 | Zunger | 715/243 |
| 2006/0036955 A1 | | 2/2006 | Baudisch et al. | |
| 2007/0074108 A1 | * | 3/2007 | Xie et al. | 715/517 |

OTHER PUBLICATIONS

Chen et al.,"Detecting Web Page Structure for Adaptive Viewing on Small Form Factor Devices," WWW 2003, May 20-24, 2003, Budapest, Hungary, ACM Mar. 3, 2005, pp. 225-233.*
Chen et al.,"Adapting Web Pages for Small-Screen Devices," IEEE Internet Computing, Jan.-Feb. 2005, pp. 2-8.*
Sengamedu, et al., "Web Page Layout Optimization Using Section Importance", retrieved at <<http://www.research.att.com/~rjana/MobEA2008/final/MobEA2008-05.pdf>> Apr. 21-25, 2008, pp. 8.
Baluja, Shumeet, "Browsing on Small Screens: Recasting Web-Page. Segmentation into an Efficient Machine Learning Framework", retrieved at <<http://www.esprockets.com/papers/www2006-2502-baluja.pdf>> May 23-26, 2006, ACM, pp. 10.
Hattori, et al., "Robust Web Page Segmentation for Mobile Terminal Using Content-Distances and Page Layout Information" retrieved at <<http://www2007.org/papers/paper752.pdf>> International World Wide Web Conference Committee (IW3C2), ACM, May 8-12, 2007, pp. 361-370.
Song, et al., "Learning Block Importance Models for Web Pages", retrieved at <<http://research.microsoft.com/users/jrwen/jrwen_files/publications/BlockImportance.PDF>>, May 17-22, 2004, ACM, pp. 9.

(Continued)

*Primary Examiner* — Cesar Paula
*Assistant Examiner* — James H Blackwell (57) ABSTRACT

Identifying panel types of elements for display on a computing device. Documents such as web pages have a layout for the elements with some elements positioned in the header, footer, and sidebar regions of the document. A browser or other application receives the elements for display (e.g., on a mobile computing device) and analyzes each of the elements to define header, footer, sidebar, and content regions. The panel types are assigned based on the region in which the element resides. Aspects of the disclosure enable manipulation of the elements by, for example, presenting the elements corresponding to content panels, centering the web page within a display area on the computing device, and preventing advertisements from being displayed.

19 Claims, 5 Drawing Sheets

OTHER PUBLICATIONS

Baudisch, et al., "Collapse-to-Zoom: Viewing Web Pages on Small Screen Devices by Interactively Removing Irrelevant Content", retrieved at <<http://research.microsoft.com/~xingx/CollapseToZoom.pdf>>, pp. 4.

Feng, et al., "Web Information Hierarchy and Importance Mining Based on Dom Information Distillation", retrieved at <<http://ieeexplore.ieee.org/stamp/stamp.jsp?arnumber=1544346&isnumber=32966>> Oct. 10, 2008, IEEE, pp. 4.

Yi, et al., "Eliminating Noisy Information in Web Pages for Data Mining", retrieved at http://www.cs.uic.edu/~liub/publications/kdd2003-webNoise.pdf>> SIGKDD, Aug. 24-27, 2003 ACM, pp. 10.

* cited by examiner

CATEGORIZING DOCUMENT ELEMENTS BASED ON DISPLAY LAYOUT

BACKGROUND

Mobile devices with a small form factor including a small display area are becoming ubiquitous. Such devices support one or more services including voice calls, electronic mail, text messaging, web browsing, and more. For web browsing, the mobile devices include a version of a browser designed to execute on the mobile device. The browser enables the user to browse web pages normally accessible via a laptop or desktop. With the reduced display area (e.g., 240×320 pixels), however, it is difficult to properly display web pages designed for larger display areas (e.g., 800×600). Some mobile device browsers reduce the size of the web pages to enable the web pages to fit on the small screens of the mobile devices. On some existing systems, the web pages are reduced by more than 30% which makes the content difficult to read by the user.

While some web sites provide pages designed specifically for viewing on mobile devices, even these web pages do not account for the differing screen sizes and resolutions supported by existing mobile devices. Further, the user often has to scroll through undesirable content such as banner advertisements and non-essential content located in the header or footer regions to locate and view the content of interest.

SUMMARY

Embodiments of the invention categorize elements for display to enable manipulation of the elements. A plurality of the elements is accessed. Each of the elements occupies a position within the display area. For at least one of the plurality of elements, a threshold distance is calculated based at least on a ratio between a height and a width of the element. The threshold distance is measured perpendicularly from an edge of the display area. The process determines whether the element is positioned within an area defined by the edge and the threshold distance. Based on the position determination, an element type is assigned to the element. In some embodiments, the element type includes a header panel, footer panel, sidebar panel, and a content panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide identification of panel types for elements 120 in a document 114 based on layout of the document 114. In some embodiments, the elements 120 include header panels, footer panels, sidebar panels (e.g., left and/or right), and content panels. The elements 120 are associated with, for example, a web page. Upon identification of the panel types, the elements 120 may be manipulated to optimize, enhance, or otherwise alter the display of the elements 120 on a computing device 102.

Aspects of the disclosure provide, at least, increased readability of elements 120 corresponding to content panels, automatic adjustment (e.g., centering) of a browser viewport to one or more content panels (e.g., to aid user interaction with the panel such as via a touch screen mobile device), and the filtering or removal of elements 120 of low interest or non-relevance (e.g., advertisements, counters, headings, etc.). Further, the disclosure avoids noise from other algorithms such as tag analyzing or visual effect merge. Additionally, embodiments of the disclosure are operable with search engine web pages.

While the computing device 102 is described herein in some embodiments as a mobile computing device, aspects of the disclosure are operable with any computing device. By way of example only, and not limitation, the computing device includes a laptop, a desktop computer, a set-top box, a handheld device, a cellular phone or smart phone, or a video gaming device.

Further, while a display area 104 described herein in some embodiments is smaller than a display area size for which the document 114 (e.g., web page) was designed, aspects of the disclosure are operable to adjust the display of the elements 120 in the document 114 to any size of display area (e.g., including display areas larger than the intended display area).

Referring again to FIG. 1, an exemplary block diagram illustrates the computing device 102 having a display, a memory area 108, and at least one processor 106. The display includes the display area 104. The memory area 108 stores one or more documents 114 such as web pages. Each of the documents 114 includes a plurality of elements 120 for display, such as element #1 through element #M. The elements 120 include, for example, hypertext markup language (HTML) elements. The elements 120 are positioned in the document 114 (e.g., positioned on the web page). The memory area 108 also stores one or more application programs 112 for execution by the computing device 102.

Figure 1:
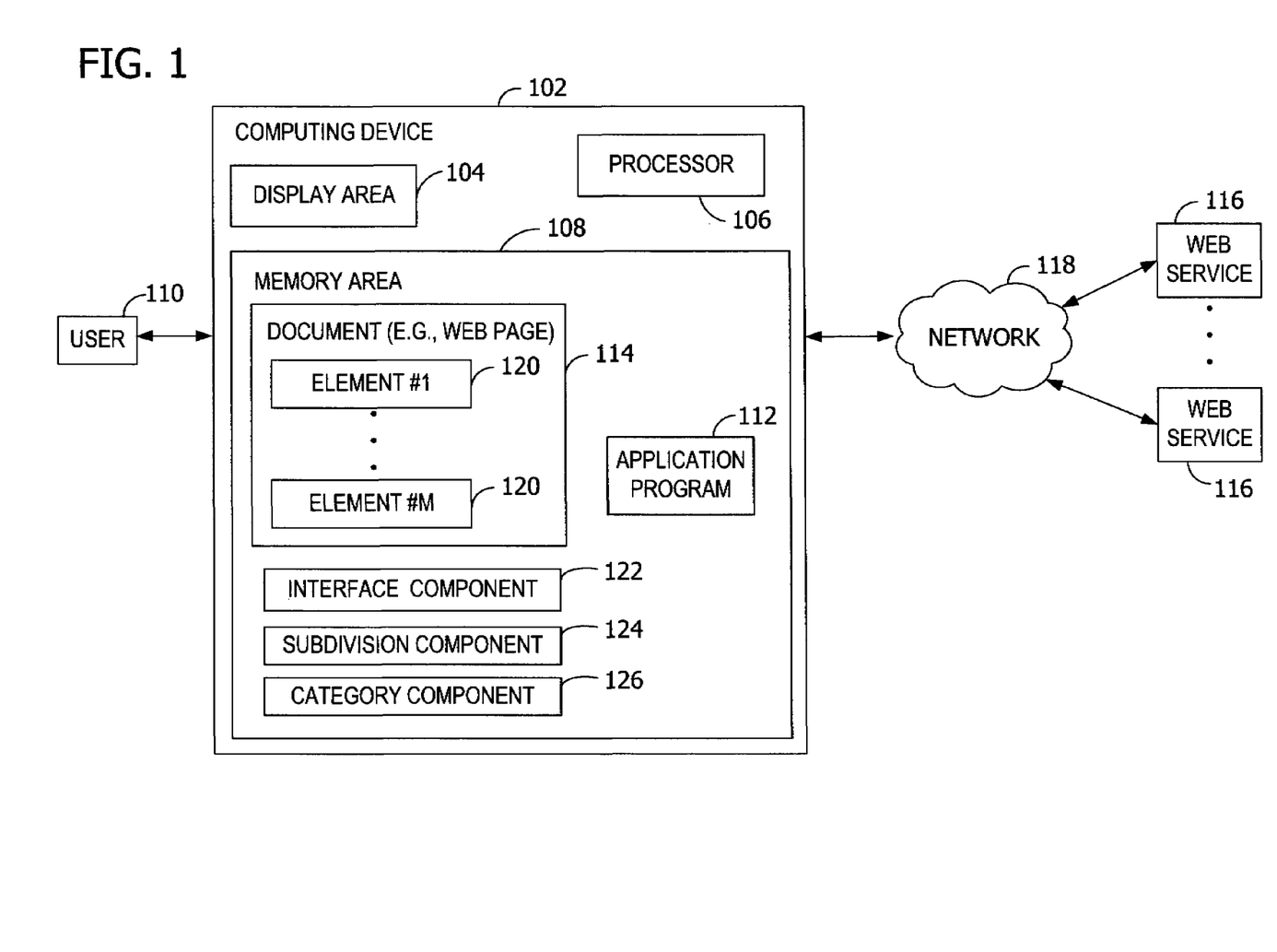
FIG. 1 is an exemplary block diagram illustrating a computing device for displaying elements associated with a document such as a web page.

In the example of FIG. 1, the memory area 108 is within the computing device 102. However, the memory area 108 or any of the data stored thereon may be associated with a server or other computer, local or remote from the computing device 102, such that the data in the memory area 108 is available on any computing device (e.g., laptop, desktop, telephone, etc.).

The computing device 102 communicates with one or more web service 116s, such as web service #1 through web service #N, or other computing devices remote from the computing device 102. The computing device 102 communicates with the web service 116s via a network 118. The network 118 may be any network including, for example, the Internet or a wireless network such as a mobile data network, Wi-Fi network, or BLUETOOTH network. In embodiments in which the network 118 is a mobile network, the computing device 102 may be a mobile computing device such as a mobile telephone. In some embodiments, the web services 116 provide the documents 114 (e.g., web pages) having the plurality of elements 120 therein.

The computing device 102 has the processor 106 associated therewith. The processor 106 is programmed to execute computer-executable instructions for implementing aspects of the disclosure. In some embodiments, the processor 106 is programmed to execute instructions such as those illustrated in the figures (e.g., FIG. 3). Further, the memory area 108, or other computer-readable media, stores one or more computer-executable components. The components include, for example, an interface component 122, a subdivison component 124, and a category component 126 for identifying panels for display on the computing device 102. These components are described below with reference to FIG. 3.

Figure 2:
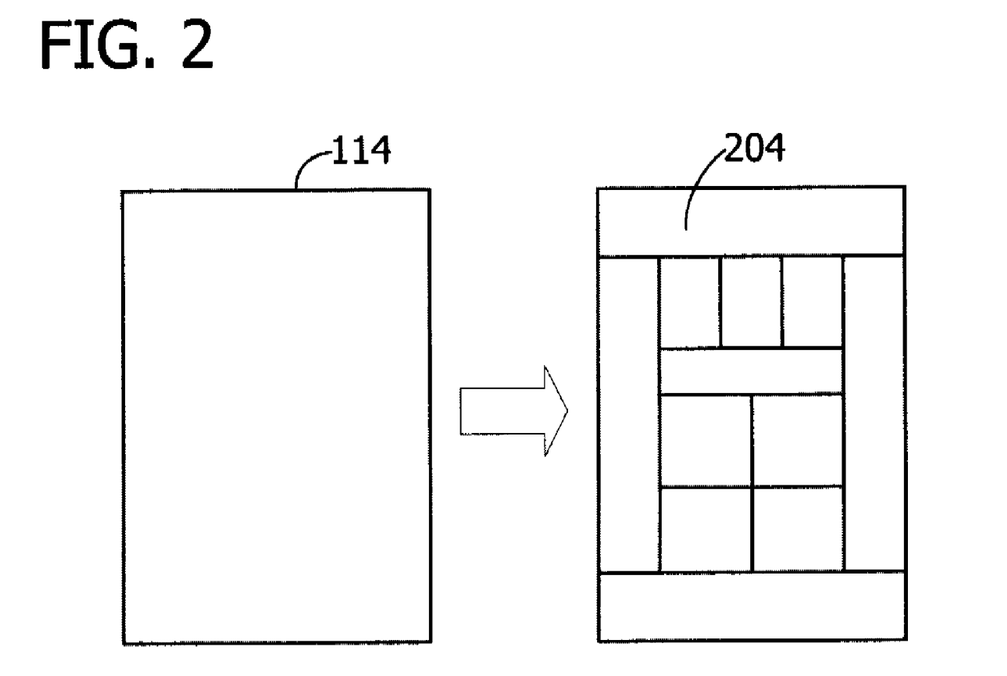
FIG. 2 is an exemplary block diagram illustrating a sample layout of a document including header panels, footer panels, sidebar panels, and content panels.

Referring next to FIG. 2, an exemplary block diagram illustrates a sample layout of the document 114 having multiple panels such as panel 204. The panels include header panels, footer panels, sidebar panels, and content panels. Each of the panels has a height and width. Further, each of the panels is represented by a corresponding element 120. In the example of FIG. 2, the panels are rectangular. Other shapes, however, are contemplated. Other exemplary shapes include parallelograms generally, diamonds, circles, and the like.

Figure 3:
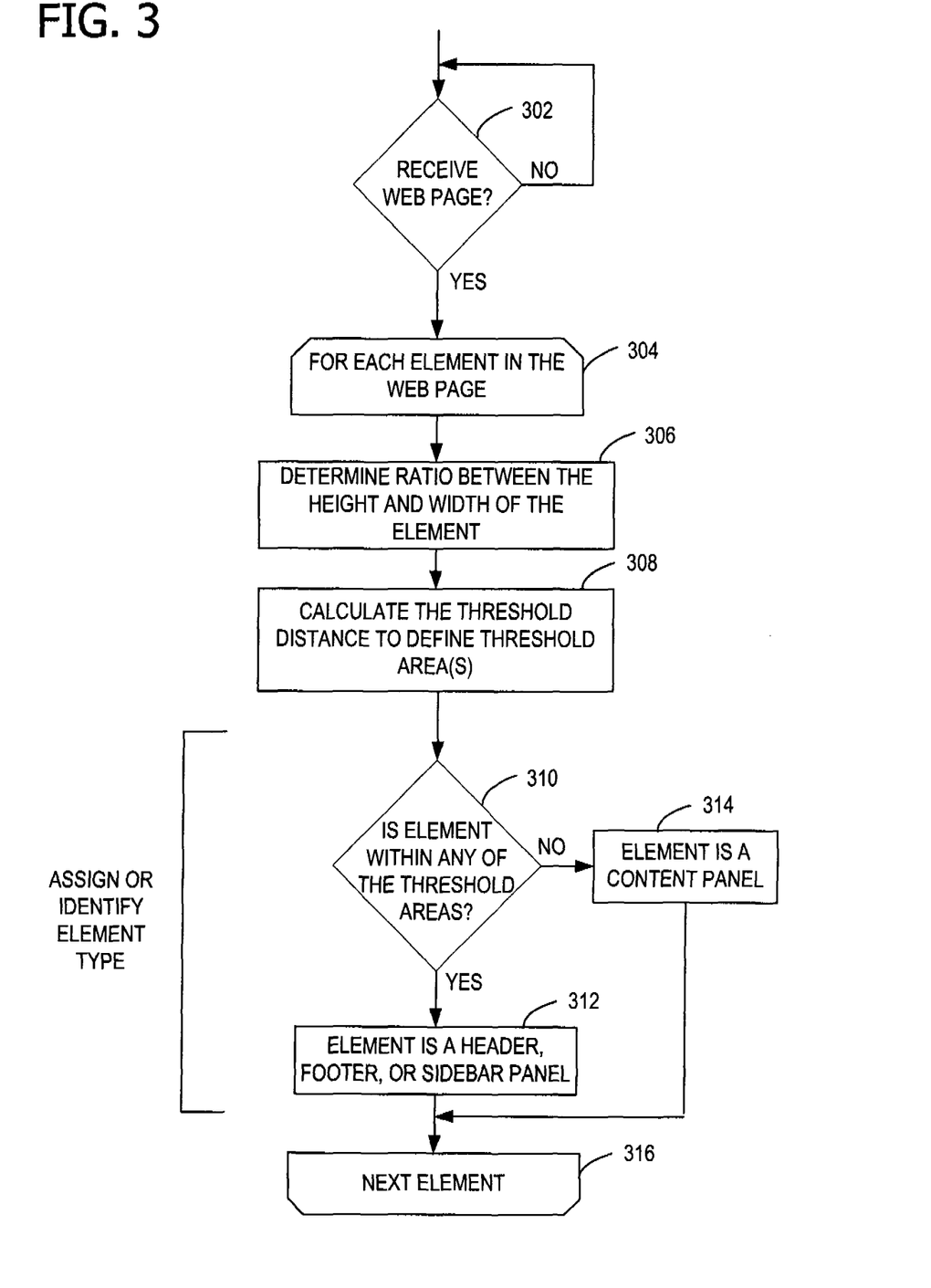
FIG. 3 is an exemplary flow chart illustrating the assignment of an element type to each of a plurality of elements in a document.

Referring next to FIG. 3, an exemplary flow chart illustrates the assignment of an element type to each of the plurality of elements 120 in the document 114. If a web page is received at 302 by the application program 112 or other logic, operations are performed for each of the elements 120 associated with the web page at 304. In some embodiments, the web page is stored in the memory area 108, and thus accessed rather than received at 302. For example, the web page may have been previously requested, received, and stored into the memory area 108. At 306, a ratio between the height and width of the element 120 is determined. For example, the ratio may include the ratio of height to width, or width to height. Both forms of ratios are within the scope of the disclosure.

At 308, a threshold distance is calculated based on the determined ratio. In the example of FIG. 3, the threshold distance corresponds to a quantity of pixels measured perpendicularly from an edge of the web page. The threshold distance is used to define threshold regions or areas based on the threshold distance. The threshold regions include rectangles or other shapes having a height and width (or width and height) defined by the edge of the document 114 and by the calculated threshold distance. For example, the threshold regions include a header region, a footer region, and sidebar regions.

The operations illustrated at 310, 312, and 314 assign an element type to the element 120. If the element 120 is not positioned within any of the threshold regions at 310, the element 120 may be a content panel at 314. If the element 120 is positioned within at least one of the threshold regions at 310, the element 120 may be a header panel, a footer panel, and a sidebar panel at 312. The header panel identifies a region at the top of the web page. The footer panel identifies a region at the bottom of the web. The sidebar panels identify regions to the left and/or right side of the web page. The element types assigned to the element 120 are associated with the element 120 or with the document 114 (e.g., web page). The process continues with the next element 120 at 316.

Referring again to operation 308, the various regions or areas may be defined as next described. The header region may be defined for each of the elements 120 by calculating the threshold distance as shown in Equation (1) below.

$$N = 200 + \frac{40}{20*x+1} \tag{1}$$

In Equation (1), x represents the ratio of the height to the width of the element 120. The value of N from Equation (1) defines the header region as the top N rows of the display area 104. The element 120 being processed is a header panel if the element 120 is entirely, substantially, or partially positioned within the top N rows of the display area 104. In some embodiments, if the element 120 is positioned completely within the region determined by N, then the element 120 is determined to be a header panel. For example, in the form of (x1, y1) (x2, y2) where (x1, y1) is the top left point and (x2, y2) is the bottom right point, the element 120 is completely inside the region of (0, 0) (page width, N) to be a header panel.

If the element 120 is not a header panel, defining the threshold area includes defining a footer region. The footer region may be defined for each of the elements 120 by calculating the threshold distance as shown in Equation (2) below.

$$N = 240 + \frac{40}{20*x+1} \tag{2}$$

In Equation (2), x represents the ratio of the height to the width of the element 120. The value of N from Equation (2) defines the footer region as the bottom N rows of the display area 104. The element 120 being processed is a footer panel if the element 120 is entirely, substantially, or partially positioned within the bottom N rows of the display area 104. In some embodiments, if the element 120 is positioned completely within the region determined by N, then the element 120 is determined to be a footer panel. For example, in the form of (x1, y1) (x2, y2) where (x1, y1) is the top left point and (x2, y2) is the bottom right point, the element 120 is completely inside the region of (0, page height−N) (page width, page height) to be a footer panel.

The calculations described herein with reference to "pixels" are based on the World Wide Web Consortium (W3C) or Cascading Style Sheets (CSS) logical pixel definition (e.g., 96 pixels per inch). However, embodiments of the disclosure are applicable with other pixel definitions. For example, the disclosure is also operable with screen pixels. In such embodiments, the quantity of screen pixels used in the calculations herein varies based on the dots-per-inch (dpi) of the device screen.

If the element 120 is not a footer panel, defining the threshold area includes defining a sidebar region. The sidebar region may be defined for each of the elements 120 by calculating the threshold distance as shown in Equation (3) below.

$$M = 0.3 * Width_{DISPLAYAREA} + \frac{40}{20*y+1} \tag{3}$$

In Equation (3), y represents a ratio of width to height. The value of M from Equation (3) defines the left sidebar region as the leftmost M columns of the display area 104, and defines the right sidebar region as the rightmost M columns of the display area 104. The element 120 being processed is a sidebar panel if the element 120 is entirely, substantially, or partially positioned within the left sidebar region or the right sidebar region. In some embodiments, if the element 120 is positioned completely within the region determined by M, then the element 120 is determined to be a sidebar panel. For example, in the form of (x1, y1) (x2, y2) where (x1, y1) is the top left point and (x2, y2) is the bottom right point, the element 120 is completely inside the region of (0, 0) (M, page height) to be a left sidebar panel (e.g., navigation panel). In another example, if the element 120 is inside the region determined by (page width−M, 0) to (page width, page height), the panel is determined to be a right sidebar panel (e.g., advertisement panel).

For web pages designed to run on small form factor devices (e.g., "short" pages), the values of N in the Equations (1) and (2) above are halved (e.g., replace N with 0.5*N). A short page has a height of content less than or equal to 600 pixels. In another embodiment, a mobile page has a content width less than or equal to the screen width. If the web page is a mobile page, the sidebar calculation in Equation (3) above is omitted from the analysis at least because the screen width is too small and the content in mobile pages is typically in a single column.

The constant values in Equations (1), (2), and (3) are examples. Other constants that are substantially similar, approximate, or variants of the listed constants are within the scope of the disclosure.

In some embodiments, the application program 112 performs the operations illustrated in FIG. 3. In such embodiments, the application program 112 displays or adjusts the display of the elements 120 based on the assigned element types. In other embodiments, the web service 116 or device performs the operations illustrated in FIG. 3. In such embodiments, the web service 116 provides the elements 120 along with the assigned element types to the computing device 102 for display and/or additional processing. By performing the operations in FIG. 3, the web service 116 in this embodiment reduces the computational burden placed on the computing device 102, and is applicable in environments in which the computing device 102 has limited processing and/or storage capabilities.

In some embodiments, the web page received at 302 has elements 120 too large for display in the display area 104. In such embodiments, the elements 120 are subdivided into sub-elements that are capable of display in the display area 104. The subdivision occurs recursively for each of the elements 120 until the elements 120 are capable of being displayed in the display area 104. The threshold for determining whether the elements 120 are too large is based on a size of the display area 104. For example, the subdivision recursively divides the elements 120 having more than 250,000 pixels (e.g., a 500×500 element). In some embodiments, the sub-elements are referred to as children elements.

With knowledge of the element type associated with each of the elements 120, the computing device 102 or other device adjust the structure, arrangement, or display of the elements 120 in the document 114. For example, the header, footer, and sidebar panels (e.g., possible advertisements) may be prevented from displaying if the computing device 102 has a small form factor such as a mobile computing device. In another example, the first content panel in the document 114 may be centered or aligned within the display area 104. In a semantic emphasizing example, the content panels may be highlighted, outlined, or otherwise visually distinguished from the other panels. In still another example, responsive to a scroll request received from a user 110 via a content panel, the computing device 102 scrolls to the next content panel (e.g., displaying the next content panel wholly or partially). In a similar fashion, the user 110 may scroll to the next header panel from a current header panel, to the next footer panel from a current footer panel, and to the next sidebar panel from a current sidebar panel. Such "navigation snap" improves the user experience while on devices such as mobile computing devices. In another example, the text in the content panels is enlarged for readability, while the text in the other panels is reduced in size.

In general, the operations listed in FIG. 2 may be performed by the components illustrated in FIG. 1. The interface component 122 receives the plurality of elements 120 for display in the display area 104. The subdivison component 124 recursively divides one or more of the elements 120 received by the interface component 122 into sub-elements having an area less than a defined threshold (e.g., the threshold is defined based on a size of the display area 104). The category component 126 assigns an element type to one or more of the elements 120 received by the interface component 122 and the elements 120 from the subdivison component 124. The category component 126 determines a ratio between a height and a width of the element 120, calculates a threshold distance based at least on the determined ratio, determines whether the element 120 is positioned within an area defined by the edge and the threshold distance, and assigns the element type to the element 120 based on the determined position. In some embodiments, the category component 126 discards (e.g., prevents from being displayed) elements 120 having a ratio less than 0.01 (e.g., elements as space holders or splitters).

Figure 4A:
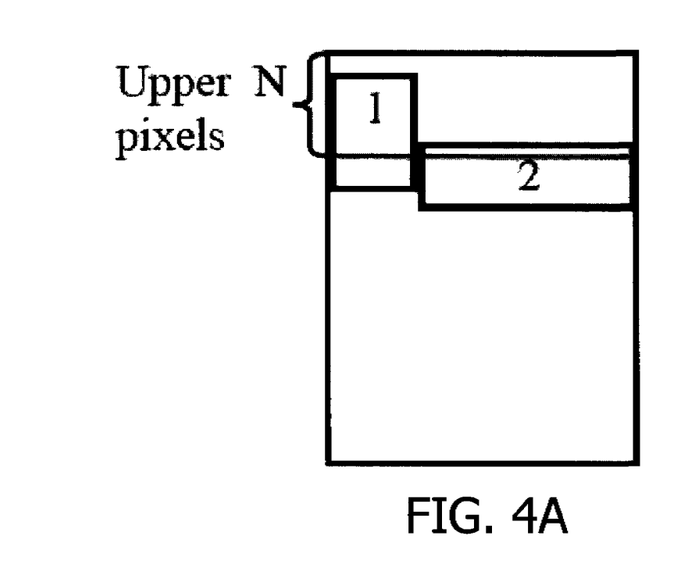
FIG. 4A is an exemplary block diagram illustrating a document having two elements partially positioned within a header region.

Referring next to FIG. 4A, an exemplary block diagram illustrates a document 114 having two elements 120 partially positioned within a header region. The upper N pixels in FIG. 4A represent a header region. In this example, N represents the threshold distance. Panel 1 and panel 2 partially overlap into the header region. However, panel 1 is not a header panel, while panel 2 appears to be a header panel (e.g., due to its long width).

Figure 4B:
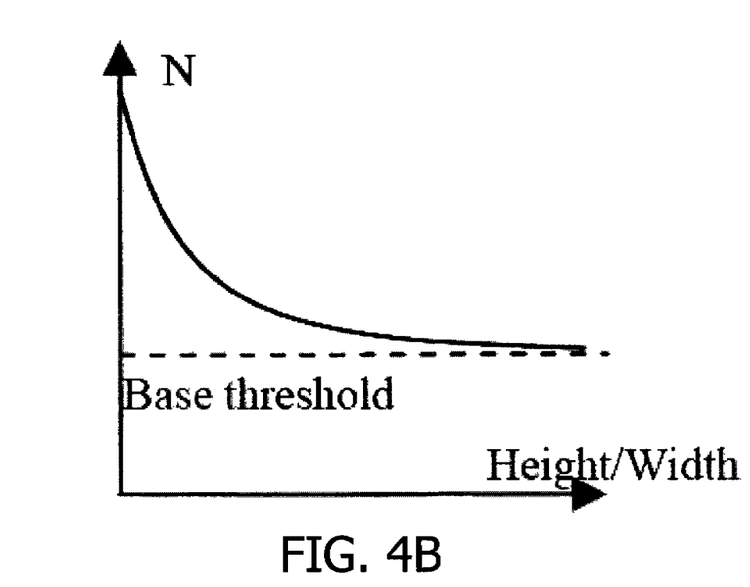
FIG. 4B is an exemplary graph illustrating a relationship between a threshold distance and a ratio of the height and width of an element for display.

Referring next to FIG. 4B, an exemplary graph illustrates a relationship between the threshold distance N and a ratio of the height and width of one of the elements 120 for display. The graph shows that as the ratio of the height to width increases, the threshold distance approaches a base threshold.

Figure 5:
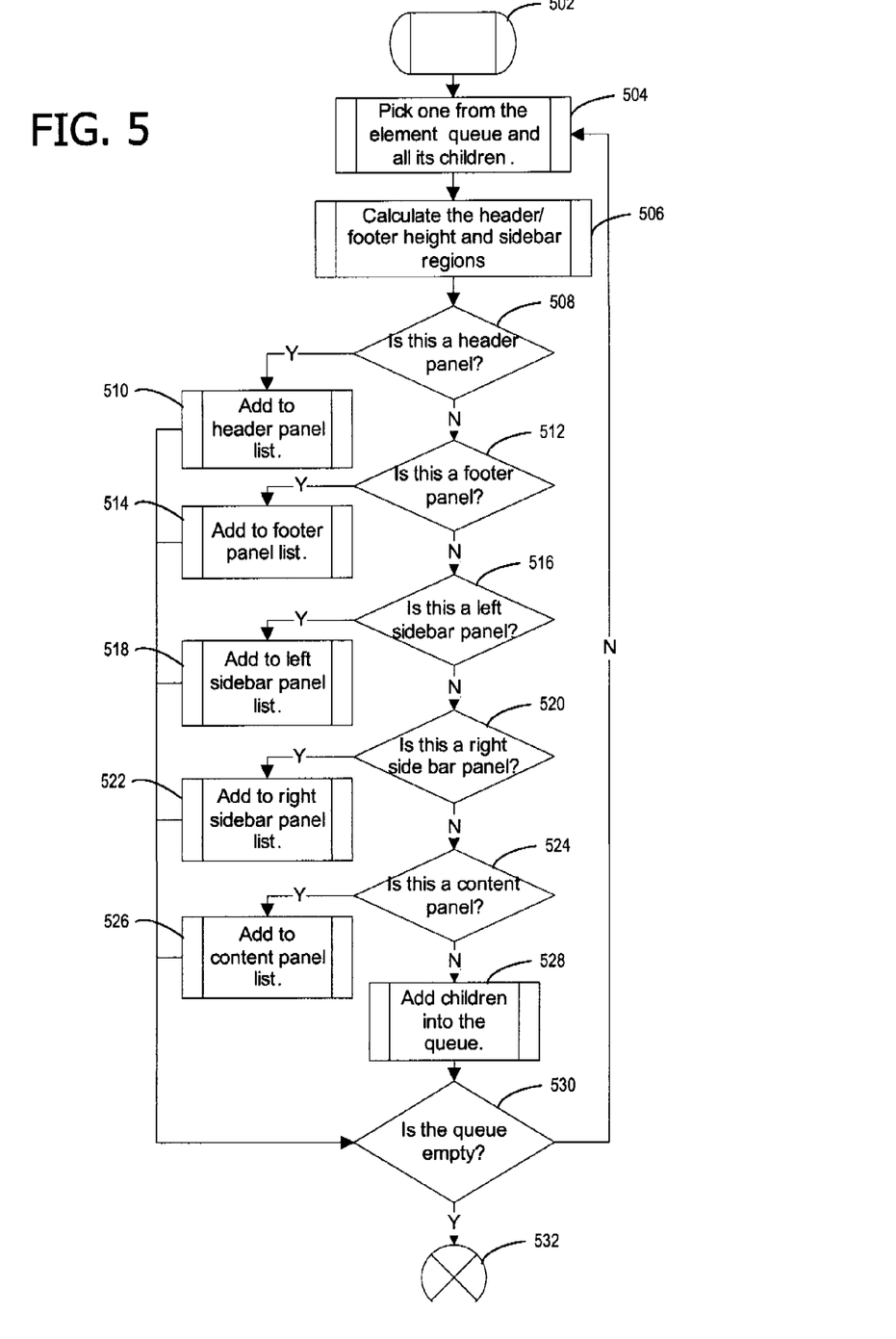
FIG. 5 is an exemplary flow chart illustrating the identification of header panels, footer panels, sidebar panels, and content panels.

Referring next to FIG. 5, an exemplary flow chart illustrates the identification of header panels, footer panels, sidebar panels, and content panels. Processing begins at 502. The elements 120 are stored in a queue. One of the elements 120 is selected from the queue at 504. The header, footer, and sidebar regions are calculated at 506, such as described herein. If the element 120 is a header panel at 508, the element 120 is added to a header panel list at 510. If the element 120 is a footer panel at 512, the element 120 is added to a footer panel list at 514. If the element 120 is a left sidebar panel at 516, the element 120 is added to a left sidebar panel list at 518. If the element 120 is a right sidebar panel at 520, the element 120 is added to a right sidebar panel list at 522. If the element 120 is a content panel at 524 (e.g., by process of elimination), the element 120 is added to a content panel list at 526. Any children elements 120 are added to the queue at 528. If the queue is empty at 530, processing terminates at 532. If the queue is not empty at 530, another element 120 is selected from the queue at 504 and processing continues.

EXAMPLES

Improvements in user ratings for accuracy of panel detection with the present disclosure are next described. In one study, the possible user ratings include "awesome," "great,"

"OK," "ugly," and "bad." With previous systems, the percentage of respondents who rated the previous system as "awesome" was 14%, "great" was 34%, "OK" was 15%, "ugly" was 21%, and "bad" was 16%.

In contrast, with the present disclosure, the "awesome" rating was selected by 31% of the polling body, the "great" rating selected 26%, the "OK" rating selected 20%, the "ugly" selected 13%, and the "bad" selected 10%.

Appendix A describes an exemplary implementation of the disclosure.

Exemplary Operating Environment

While aspects of the invention are described with reference to the computing device 102, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a hand-held television, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for identifying content panels in the plurality of elements 120, and exemplary means for modifying the web page for display based on the identification of the elements 120 as content panels.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below is source code for implementing aspects of the present disclosure. In particular, the routine IPanelDetector is described.

```
interface IHTMLElementCollection;
[
    object,
    pointer_default(unique),
    uuid(43FE164B-53BF-4dbc-BC26-3915E7541DC5)
]
interface IPanelDetector : IUnknown
{
    [ ] HRESULT getAllPanels([out] IHTMLElementCollection**
ppIEC,[out] DWORD* pVersion);
    [ ] HRESULT getContentPanels([out]
IHTMLElementCollection** ppIEC,[out] DWORD* pVersion);
    [ ] HRESULT isDirty([in] DWORD version,[out] BOOL* pDirty);
};
```

The interface above can be queried from a document object.

The method "isDirty" checks if the version number passed in is up-to-date or not.

The method "getAllPanels" will provide a collection of elements identified as panels, and a version number of this collection. The panel collection may be out-of-date after the layout of the page changes. However, the out-of-date collection only causes inaccurate detected panels. Users can use "getAllPanels" each time to get an up-to-date collection since the detection result is cached if no layout change occurs. But the user can use the method "isDirty" to determine whether the collection it is holding is out-of-date.

The method "getContentPanels" is similar to "getAllPanels" while it provides a collection of elements identified as content panels.

What is claimed is:

1. A system for identifying panels for display on a mobile computing device, said system comprising:
   a memory area for storing a web page comprising a plurality of elements, each of said plurality of elements being positioned on the web page, and each of the plurality of elements having a height and width associated therewith; and
   a processor programmed to:
      receive, by an application program executing on the mobile computing device, the web page; and
      for each of the plurality of elements:
         determine a ratio between a height and a width of the element;
         calculate a threshold distance based at least on the determined ratio, said threshold distance corresponding to a quantity of pixels measured perpendicularly from an edge of the web page;
         adjust the calculated threshold distance based on a size of a display area of the mobile computing device by halving the calculated threshold distance if a height of the display area is less than or equal to 600 pixels;
         determine whether the element is positioned within an area defined by the edge and the threshold distance;
         identify the element as a header panel, footer panel, or sidebar panel if the element is positioned within the area based on the position determination; and
         identify the element as a content panel if the element is not positioned within the area based on the position determination.

2. The system of claim 1, wherein the processor is further programmed to recursively subdivide one or more of the plurality of elements into sub-elements having an area less than a defined threshold, said threshold being defined based on the size of the display area.

3. The system of claim 1, wherein the memory area stores the elements as hypertext markup language elements.

4. The system of claim 1, further comprising:
   means for identifying content panels in the plurality of elements; and
   means for modifying the web page for display based on the identification of the elements as content panels.

5. The method of claim 1, wherein the processor is programmed to calculate the threshold distance by calculating a plurality of threshold distances each for detecting the header panel, the footer panel, or the sidebar panel.

6. A method comprising:
   accessing a plurality of elements for display in a display area, each of said plurality of elements occupying a position within the display area, and each of the plurality of elements having a height and width associated therewith; and
   for at least one of the accessed plurality of elements:
      determining a ratio between a height and a width of the element;
      calculating a threshold distance based at least on the determined ratio, said threshold distance being measured perpendicularly from an edge of the display area;
      determining whether the element is positioned within an area defined by the edge and the threshold distance; and
      assigning an element type to the element based on said determining, wherein the assigned element type identifies a region of the display area,
      wherein y represents a ratio of the width to the height, and wherein calculating the threshold distance comprises calculating M to identify sidebar panels, where $$M = 0.3 * Width_{DISPLAYAREA} + \frac{40}{20*y+1}.$$

7. The method of claim 6, further comprising associating the assigned element types with the elements, wherein an application program displays the elements based on the assigned element types.

8. The method of claim 6, further comprising providing the elements and the assigned element types for display on a computing device.

9. The method of claim 6, wherein an application program executing on a computing device associated with the display area performs said accessing, said determining the ratio, said calculating, said determining whether the element is positioned within the area, and said assigning.

10. The method of claim 6, wherein a web service communicating with a computing device associated with the display area performs said accessing, said determining the ratio, said calculating, said determining whether the element is positioned within the area, and said assigning.

11. The method of claim 6, wherein the plurality of elements are associated with a web page, and further comprising requesting the web page prior to accessing the plurality of elements.

12. The method of claim 6, wherein x represents the determined ratio, and wherein calculating the threshold distance comprises calculating N to identify header panels, where $$N = 200 + \frac{40}{20*x+1}.$$

13. The method of claim 12, wherein determining whether the element is positioned within the area defined by the edge and the threshold distance comprises determining if the element is positioned within the top N rows of the display area.

14. The method of claim 6, wherein x represents the determined ratio of height to width, and wherein calculating the threshold distance comprises calculating N to identify footer panels, where $$N = 240 + \frac{40}{20*x+1}.$$

15. The method of claim 14, wherein determining whether the element is positioned within the area defined by the edge and the threshold distance comprises determining if the element is positioned within the bottom N rows of the display area.

16. The method of claim 6, wherein determining whether the element is positioned within the area defined by the edge and the threshold distance comprises determining if the element is positioned within a leftmost M columns of the display area.

17. The method of claim 6, wherein determining whether the element is positioned within the area defined by the edge and the threshold distance comprises determining if the element is positioned within a rightmost M columns of the display area.

18. One or more computer storage media having computer-executable components, said components comprising:
- an interface component for receiving a plurality of elements for display in a display area, each of said plurality of elements occupying a position within the display area, and each of the plurality of elements having a height and width associated therewith; and
- a subdivision component for recursively dividing one or more of the elements received by the interface component into sub-elements having an area less than a defined threshold, said threshold being defined based on a size of the display area; and
- a category component for assigning an element type to one or more of the elements received by the interface component and the elements from the subdivision component, wherein the category component:
  - determines a ratio between a height and a width of the element;
  - calculates a threshold distance based at least on the determined ratio, said threshold distance being measured perpendicularly from an edge of the display area;
  - determines whether the element is positioned within an area defined by the edge and the threshold distance; and
  - assigns the element type to the element based on the determined position,
- wherein the subdivision component recursively divides the elements having more than 250,000 pixels, and wherein the category component further discards elements having a ratio less than 0.01.

19. The computer storage media of claim 18, wherein the category component assigns one of the following element types to the element: a header panel, a footer panel, a sidebar panel, and a content panel.

* * * * *